United States Patent
Görtz et al.

(10) Patent No.: US 7,551,916 B2
(45) Date of Patent: Jun. 23, 2009

(54) METHOD AND DEVICE FOR AUTOMATICALLY CHANGING A DIGITAL CONTENT ON A MOBILE DEVICE ACCORDING TO SENSOR DATA

(75) Inventors: Udo Görtz, Bochum (DE); Knut Haberland-Schlösser, Bochum (DE); Klaus Rateitschek, Bochum (DE); Wolfgang Theimer, Bochum (DE); Peter Weingart, Bochum (DE); Reza Serafat, Bochum (DE); Matthias Lück, Bochum (DE); Jakke Mäkelä, Turku (FI)

(73) Assignee: Nokia Corporation, Espoo (FI)

( * ) Notice: Subject to any disclaimer, the term of this patent is extended or adjusted under 35 U.S.C. 154(b) by 62 days.

(21) Appl. No.: 10/517,250

(22) PCT Filed: Jul. 11, 2002

(86) PCT No.: PCT/IB02/02724

§ 371 (c)(1),
(2), (4) Date: Sep. 15, 2005

(87) PCT Pub. No.: WO2004/008411

PCT Pub. Date: Jan. 22, 2004

(65) Prior Publication Data

US 2006/0109102 A1    May 25, 2006

(51) Int. Cl.
*H04M 1/725* (2006.01)
(52) U.S. Cl. .............. 455/412.2; 455/413; 455/414.1; 455/414.2; 455/412.1

(58) Field of Classification Search ................ 340/351, 340/691.1; 455/344, 456.6; 329/88.19, 220.01
See application file for complete search history.

(56) References Cited

U.S. PATENT DOCUMENTS

| 5,200,735 | A | | 4/1993 | Hines | 340/539 |
|---|---|---|---|---|---|
| 5,446,445 | A | | 8/1995 | Bloomfield et al. | 340/521 |
| 6,781,623 | B1 | * | 8/2004 | Thomas | 348/208.4 |
| 2001/0027378 | A1 | | 10/2001 | Tennison et al. | 701/213 |
| 2002/0113872 | A1 | * | 8/2002 | Kinjo | 348/116 |
| 2002/0150228 | A1 | * | 10/2002 | Umeda et al. | 379/220.01 |
| 2004/0208297 | A1 | * | 10/2004 | Valentine | 379/88.19 |
| 2005/0213790 | A1 | * | 9/2005 | Rhoads et al. | 382/100 |
| 2005/0272447 | A1 | * | 12/2005 | Eckel | 455/456.6 |
| 2007/0006327 | A1 | * | 1/2007 | Lal et al. | 726/31 |

FOREIGN PATENT DOCUMENTS

| EP | 1143400 A1 | 10/2001 |
|---|---|---|
| JP | 407154856 A * | 6/1995 |
| WO | WO 01/63318 A1 | 8/2001 |

* cited by examiner

*Primary Examiner*—David Q Nguyen (57) ABSTRACT

Disclosed is a method for handling and generating and editing of digital documents or digital contents on mobile electronic devices in accordance with sensor data perceived. The method comprises the reception of sensor data or the monitoring of sensors, and the generation of said digital content according to said perceived sensor data. It is further disclosed a mobile terminal and a network device disclosed that are capable of handling a digital content according to the above mentioned methods.

22 Claims, 3 Drawing Sheets

METHOD AND DEVICE FOR AUTOMATICALLY CHANGING A DIGITAL CONTENT ON A MOBILE DEVICE ACCORDING TO SENSOR DATA

CROSS-REFERENCE TO RELATED APPLICATION

This application is the U.S. National Stage of International Application Number PCT/IB2002/002724 filed Jul. 11, 2002 and published in English on Jan. 22, 2004 under International Publication Number WO 2004/008411 A1.

BACKGROUND OF THE INVENTION

1. Technical Field

The present invention relates to the field of mobile electronic devices capable of editing digital contents. It also relates to a new user interface and to a new way for editing digital contents in mobile electronic devices. The present invention also relates to a new way for automatically generating digital contents. The present invention further relates to mobile devices with a huge storage.

2. Discussion of Related Art

The invention relates to the editing of digital text/audio/video content, which has been stored or taken via audio recorder, camera or received via DVB-T for instance. As a part of a new entertainment experience, users of mobile electronic devices can download personalization elements such as logos and ringing tones or sleep mode indications from a supplier, as known from mobile phones. The users of mobile devices are going to demand devices that enable the user to express creativity and personalization even via the electronic devices he uses. Users are going to demand the ability to modify and create electronic content with their mobile electronic devices.

So far, mobile devices are quite limited in storage and processing power, but in near future there will be mass memories available even for mobile devices at reasonable prices enabling new exciting applications for customers. The present invention relates to new applications and mobile devices. A creation of digital content and the editing thereof by users is currently limited to SMS.

From the state of the art it is known to integrate an answering machine functionality with announcement texts into a mobile telephone. This is for example described in the document WO 01/78364. In this document it is disclosed that an answering machine can reproduce different answering announcements depending on the actual operation state of the device.

DISCLOSURE OF INVENTION

In contrast, it is desirable to offer a user mobile electronic device capable of providing more than a playback functionality for "canned" text, logos, music, pictures and videos. Instead it is possible that an integrated answering machine be adapted to edit, generate, process and change digital content of storage in accordance with variable conditions such as sensor data, manual input, device settings and operating parameters, respectively.

It is desirable to provide an improved ability of mobile devices and methods for creating and modifying digital content beyond the very limited state of the art.

According to a first aspect of the present invention a mobile electronic device is provided that comprises a storage to store digital content and has a processor that is configured to edit said stored digital content, and that is characterized by a component to obtain data from an outside or inside sensor. The processor of said devices is configured to edit, generate, process and/or simply change said digital content according to said obtained sensor data. This embodiment is a kind of data analyzer or evaluator, wherein said data are used to edit an electronic content. To visualize one of the benefits of this embodiment, the device can receive sensor data and automatically edit e.g. a digital form accordingly. Thereby, the digital content can e.g. be a digital form that is filled in according to said obtained sensor data. The special application and embodiment can be chosen according to the desired application and the desired functionality.

To enable a new experience of entertainment, it is important to give users more freedom and possibilities to be creative and innovative. It is also important to make mobile devices reliable, so that they can be used for a couple of activities for which users up to now need a lot of devices. There is no reason why a user should be bothered with the maintenance of different battery packs of different mobile electronic devices. As mentioned already, users do not want to just handle pre-designed content, they want to create own content and have freedom of editing it. A user might want to edit and combine, e.g. video sequences or still pictures with audio and text sequences.

As mentioned already, users do want to not only just consume content, they want to create own content and have freedom of editing it. E.g. video sequences or still pictures can be combined with audio (I.e. video clips played to music) and games and events or sensor data (incoming call, time, diary input, etc.). They can be recorded provided there is a kind of audio/video phone application in the device.

Just as a non limiting example the generation of a digital document is executed by retrieving a template (like known from text programs like e.g. Microsoft Word). Then sensor data e.g. from a position sensor of the device are obtained by means of well known positioning systems. The template can then be recalled according to the present position, e.g. when recalling a template from the home position, a private template is automatically recalled and filled in with a home address: If the user is located at his workplace, a firm template can be recalled, and filled in with the firm address. In case the user is recalling the template from a location the device can identify, the position e.g. by comparative information evaluation, the template can be selected according to the person said address is related to. If a firm address is detected the firm template is recalled and added with a position information such as currently at "Firm ###". If the actual position is related to a personal friend, a private template can be recalled and the actual position e.g. with a communication information can be added to the template.

The same principle can be applied to the generation of the letter-heading of a FAX, e.g. on mobile fax enabled devices.

Just as a non limiting example: in case of a game of skill application on said mobile electronic device, a gravity sensor can be used to maneuver a virtual bullet through a virtual maze by just tilting the mobile electronic device. In such an application, the electronic content would be game data or display data.

In yet another embodiment said mobile electronic device further comprises a communication device. The application of a communication device has the main advantage that a user can exchange e.g. a digital content, and can further receive e.g. sensor data from a remote sensor according to a presently used application.

In another embodiment of the present invention, said mobile electronic device further comprises a mailbox, wherein said digital content to be edited is an announcement of said mailbox. The mailbox can be a mailbox for electronic mail, as known from the field of mobile communication such as E-mail, SM (Short message), MMS (multi media message) and the like. The mailbox can be a voice-mailbox known from the mobile communication network. The mailbox or voice mailbox can be a built-in voice-mailbox also known as an answering machine. In the case of a built-in mailbox said digital content is e.g. an announcement text which is altered according to obtained sensor data.

It should be noted that this embodiment of the invention is directed to obtain sensor data and generate a mailbox announcement according to said sensor data. The implementation of an answering machine in a mobile electronic device has several advantages:

- Different answer texts can be generated by editing a basic text
- The calling line can be identified and the answering text can be edited accordingly
- Sensed phone profile settings can be used for editing an answering text
- The location/context of the caller can be sensed and considered for editing the answer text.
- The answer texts and the relation to sensor data can easily be changed without call connection costs
- Messages from callers are stored on the terminal and can be accessed easily, similarly without connection costs.

The announcement of a mailbox can be automatically generated/edited in dependence of the present position and or the time. For example if no sensor data are available, a basic text like "This is telephone NR. ### please leave a message after the Signal" can be reproduced. If more sophisticated sensor data are available, and it is detected that the caller is e.g. an employee of the same Firm, an announcement such as: "Sorry Mr., ### I'm actually in a meeting in room NR. ###, please call back at ## o' clock, or dial 22 for a return call request, or leave a message after the signal". If more sensor data are available, an announcement like "This is ####, I am presently on vacation on caiman island, local time 3 a.m. and I am surly asleep, please try again in 7 to 8 hours, or leave a message after the signal . . . ".

It may be noted that the answering text can be generated automatically or manually. In a basic embodiment e.g. only an announcement of a local time in an answering text can be edited automatically wherein e.g. the selection between a private or business answering text has to be made manually.

Also, the present invention is not just directed to automatically selecting between a number of pre-stored answering announcements, it can also be applied to such a solution if e.g. two or more basic announcements are stored that are selected and edited according to said obtained sensor data.

In another embodiment of the present invention said processor is configured to edit, generate, process and/or change the announcement of said mailbox automatically according to said obtained sensor data. A fully automated selection and editing of announcements, requires less user interaction for a sophisticated answering machine functionality.

This embodiment of the invention is for the situation that the user of a mobile phone (or mobile device in general) gets an incoming phone call but is not able to accept the call. In these situations a phone answering machine is useful to record a message from the calling party. In mobile telephony, this functionality so far has been provided by the network operator, i.e. the message is stored in the network and the user can later establish a voice call to his personal mailbox in the network to listen to the recorded messages.

If the mobile device is equipped with sufficient storage capacity, there are good reasons to integrate the answering machine functionality into the mobile device itself. On the one hand this reduces costs for the user because there is no need to call a personal mailbox in the network, and on the other hand the user benefits from the faster access to his stored messages.

The answering machine of this embodiment is much more refined than the conventional network-based solutions available today, and provides more convenience/comfort and opportunities to the user. For instance, the following functionality could be realized:

- The answering machine can be configured in a way that it is activated/deactivated for specified callers or caller groups, if the device comprises a caller identification sensor,
- The answering machine can be configured in a way that for specified callers/caller groups individual announcements are used, i.e. for business partners, friends and schoolmates,
- Each caller/call group can be given a varying amount of time for leaving messages, by editing the maximum size of a storage area in a storage of said phone,
- The answering machine can be configured in a way that the announcement varies according to time, number of tried calls, location of the user, or other parameters, obtained via respective sensors,
- In addition to the voice/audio announcement the answering machine sends a predefined text or a multimedia message to the calling party, this message may be user configured to be sent only when e.g. a certain caller is connecting the mailbox, e.g. combined with a predetermined time period,
- The answering functionality is not limited to incoming voice calls in cans of a voice box, but could be extended to handle incoming messages as well. This feature enables a user to reject E-mails from certain addresses providing a "blacklist" functionality, to the mailbox,
- The answering machine can communicate with the network in order to divert selected callers/caller groups to another phone number, providing a selective rerouting, which may be combined with a net-based mailbox with an extremely long answering text, to overload undesired caller with unnecessary information,
- The answering machine can be operated depending on the currently active phone mode or phone profile, the answering text can comprise information about the actually active phone mode.

For the above scenarios it is helpful that the answering machine is very closely linked with the phonebook of the user and the currently selected phone setting in general. In order to achieve the same level of functionality with network-based answering machine solutions, all information phone book entries, position data, local sensor data, etc have to be requested from the phone. Another advantage of a built in mailbox resides in the fact that the incoming calls are stored locally in the device and not in the network, and the user can access the recorded messages faster than today and without the additional costs for calling his mailbox number. However, outside mailbox connection increases service provider profit. The user is also becoming more independent from the environment since he has not to care about network coverage, etc. This embodiment of the invention provides a cheap and highly configurable call answering solution to users of mobile devices. The user further benefits as he is becoming more independent from network coverage, and as he has more options to adapt the system to his personal needs.

In another embodiment, said mobile electronic device further comprises a mobile telephone. The mobile telephone application is mentioned to underline that the communication device can comprise a classical mobile telephone, and is not limited to just VoIP (Voice over Internet Protocol) or such devices. The use of the present invention in a mobile telephone or a communicator provides the advantage that many people can benefit from the advantages rising from the automated editing of digital content, and automated answering machine text editing.

In yet another embodiment of the present invention said mobile electronic device further comprises a text to speech transducer. The use of a text to speech transducer enables the device to reduce the amount of data to be stored necessary to generate and edit an answering text of said voice mailbox. So instead of storing a whole audio recording of the user's voice, the answering text can be stored as e.g. a small ASCII file. So according to this embodiment, the answering text can be stored and edited as a text and then, the edited text is "read out" by the mailbox e.g. by means of a synthetically generated voice. To personalize the synthetic voice the frequency range, the modulation and e.g. the speech rhythm of the user may be recorded and used for the generation of a digital content.

In one embodiment of the present invention, said stored digital content comprises digital audio data. With mass memory in place, it is possible to store large amount of audio data. In a mobile electronic device providing this option, a software audio player application can be stored in a memory as well, so it does not have to be available as a hardware component in the device but it can be there, of course, as well. With an audio player and e.g. an audio recorder a user can use the mobile electronic device as an electronic dictating machine, offering a post process and editing function, to post-process digitally stored audio data. another application of an audio processing can be used to accompany an audio text with music. Especially for young people a mobile device can comprise e.g. a MP3 player offering a mixing desk functionality to post process stored music according to the personal preferences.

The audio embodiment of the present invention can also be used for audio composing. Audio composing and editing is comprised of:
playing of audio content via internal and/or external speakers/headphones
creating of audio data from scratch via speech/sound recording, MDI composer, ringing tone composer, sound effects creation
deleting, moving, copying, storing of content
exchanging with other people,
mixing/combining (MIDI, speech samples, music),
link to events
modifying/changing existing content
converting format
linking to events (like incoming MMS or calls)
attaching (e.g. to MMS)

In another embodiment of the present invention said stored digital content comprises digital picture/video data. With mass memory in place, it is possible to store large amount of picture and video data or even movies including sound, i.e. on a storage media such as an optical disc, a hard disc or the like. A software based player for audio/video content can be stored in this memory device, so it does not have to be available as a hardware component in the device, which can be there, of course, as well. A processing of video sequences is a vital prerequisite to the use of video data in a mobile environment. The use of uncut video data requires much storage space, which is too valuable to be wasted to visual ballast. With a possibility to edit e.g. the audio track of video data on a mobile device, a user may take one video sequence, and comment it with different audio tracks and transfer it to different addresses as a multimedia postcard, without the need to record a new video sequence.

The device can be used as mobile audio/video player (i.e. compression means for storing a DVD on just a single CD-ROM do exist) and connected with home stereo/video equipment via a short range radio connection like Bluetooth or cable.

The applications of the embodiments of the preceding description can be logically divided into e.g. three main parts: for example audio composing and editing, video composing and editing, and audio/video linking. audio composing has already been described in the preceding description.

Video composing and editing is comprised of:
recording of video data from TV and integrated or attached camera (video sequences and still images)
displaying still images and showing video sequences on device screen and connected TV or PC monitor, where resolution is adapted to resolution of connected screen
creating images/videos from scratch using camera/drawing application
copying, exchanging, backup, moving, deleting,
converting format,
modifying/changing, mixing/combining,
linking to events (like incoming MMS or calls),
attaching (e.g. to MMS)
Audio and video linking is comprised of
attaching of audio (e.g. sound, speech, music) to images and videos
attaching of images and videos to audio (e.g. sound, speech, music)

In yet another embodiment of the present invention, said stored digital content comprises digital text data. Compared to the processing of audio and video data, the editing of a text data seems to be known from editing SMs (Short Messages), but in the combination with the editing of pictures, audio and video data and the use of sensors for editing, even a text editing application is new and inventive. So one embodiment of a mobile electronic device according to the invention can be used to combine a picture with a headline, or a saying, provide subtitles to audio and video data and the like, which is actually not possible with currently available mobile devices.

A picture gallery including images, photographs, smileys and audio samples can serve as starting point for creativity. The user can add own content, be it still images, small video sequences or own audio recordings. Equipped with a camera the device is a travel camera as well. A picture editor (i.e. stored on the removable medium) is to modify pictures and videos and it is possible to send them to friends via MMS. Similar is true for an audio editor. Digital postcards gallery at holiday saved on an optical disc is another embodiment.

As in the case of audio and video composing, editing, and linking, these techniques can also be applied and combined with digital text data.

In fact, from possible actions point of view there is no substantial difference between audio and video content and the difference to a text content is dependent from the file format actually chosen, so it may be noted that a common composing and editing application for all digital content can also be used.

In yet another embodiment of the present invention mobile electronic devices further comprise a processor configured to evaluate said obtained sensor data. This evaluation step can help and will help to decide if an obtained sensor data is available and meaningful. E.g. in case of clock values below 0 and above 24 hours and temperature values below 0K and above 400K the ranges are exceeded and are not meaningful and can therefore be rejected. Similarly, acceleration values above 10 g and speeds above 200 km per hour are also not meaningful and therefore should be rejected, as it can be expected that the phone under such conditions can not be operated properly.

Another benefit of an evaluation of the sensor data provided is that the editing of the digital content is executed according to proper data and according to a proper relationship between sensor data and digital content to be edited. This may best be visualized by an example of the aforementioned mailbox embodiment. In the mailbox, a basic answering text can be chosen and altered according to the sensor data, in case of the inconsistent sensor data, these data can be rejected to prevent an inconsistent answering text. Thereby answering texts such as "I am, on vacation on room ###, will not be back until Mar. 17, please leave massage after the signal" wherein a device status (vacation, and return on Mar. 17) information is in conflict with a position information (room ###). Such conflicts can be detected and avoided by an evaluation operation such as plausibility estimation. Such plausibility estimations can e.g. be done by means of a plausibility table or a list of incompatible events.

In another embodiment of the present invention said component to obtain sensor data comprises a receiver. A receiver can be used to receive e.g. a clock signal such as the DCF 77, or remote data from GPS satellites or from a remote sensor e.g. position sensor data via cellular positioning methods such as Enhanced Observed Time Difference (E-OTD). In case the environment provides a low range radio network such as a Bluetooth or WLAN network a receivers network identification can be used to identify a location of the mobile electronic device.

According to yet another embodiment of the present invention said component to obtain sensor data comprises at least one built-in sensor within said mobile electronic device. Such sensors can be battery power devices, sensors to detect if said device is operated in a car with a hands-free device, illumination sensor, temperature sensors, sensors for determining a remaining storage space and the like.

In another embodiment of the present invention, one of said sensors is an acceleration sensor. In case of an acceleration sensor said audio editing application can use the sensor data to generate e.g. a beat or drum rhythm if the user moves the device in a drumstick fashion, wherein the amplitude and the shape of the movement can be used to generate sound and loudness and the frequency to generate a beat. This would be some kind of a handheld percussion device. In the same fashion virtual Drums, Bongos or even virtual Xylophones are realizable, e.g. by integrating the data of the acceleration sensors and relate every position to another tone.

Another editing application in the field of text editing can e.g. be a format and a "sponge"-functionality. For example an acceleration sensor can be used to detect if the device is tilted, and can accordingly adapt the setting of a text, e.g. if the device is tilted to the left or right, a text on the device is formatted to the left or the right, respectively. If the device is tilt up, a new line is created, and if the device is tilt down a new paragraph is created. The sponge functionality, can be embodied e.g. as follows: if the device is shaken once, the last word can be removed, and if the device is shaken twice the last line or sentence is removed, if shaken three times the last paragraph can be deleted and if the device is shaken continuously the whole document is deleted. In another embodiment, the shaking process can be used to start a coding or an encryption of said text document.

A more general method for performing the editing of content with an acceleration sensor can be provided by modifying pictures/images, according to a detected movement. The faster the device is moved into a certain direction the more the image changes accordingly. In case of a gravity sensor application, a virtual bullet can be rolled over a concave RGB plane, so that a user can change histogram data by tilting the device. In case a color monitor is used, the three color edges can be depicted by color patches in the corners of the display, and a small e.g. bullet shaped cursor indicates the position of a histogram element in an RGB plane.

In another embodiment of the present invention one of said sensors is a position sensor. Positioning sensors such as GPS (Global Positioning System)/DGPS (Differential GPS), Glonas (Global Navigation System), or cellular positioning methods such as E-OTD provide an auto editing feature for letter-heading, or an auto position indication for mailbox announcements the letter-heading feature can be used to automatically insert address or sender information according to the present position in a letter or an E-mail, or the like message.

In another embodiment, said mobile terminal device comprises an optical sensor. The optical sensor can be in the simplest case an illumination sensor for changing e.g. an display illumination more sophisticated embodiments can provide a biometrically based user recognition system to recall user specific settings according to a determined user. The optical sensor can be a fully grown scanner capable of reading texts without the need to touch a surface e.g. by a photo or a scanning beam based system.

In another embodiment of the present invention said sensor is for sensing atmospheric properties. The sensor can be to measure temperature of the device or the body temperature of the carrier of said mobile terminal device, and other meteorological values such as, pressure on the device, air pressure, humidity, insulation (solar flux), pollution values, e.g. poll incidences for allergic persons, Ozone values and the like.

Pressure sensor values can be used to enhance a text in the text mode to generate a text bolder or thinner flag according to a sensed pressure. The pressure sensor can be used to mark text passages or to play, play fast forward or rewind digital music data and the like, to provide a kind of "jog dial" functionality to a simple pressure sensor. Another example is a temperature sensor. Depending on the ambient temperature an image could change its saturation or a speech sample its pitch frequency. Also the noise level picked up from the microphone or the dynamics of music currently played can be used as input for editing. Using sensor input, funny and not easy-to-predict modification of content is possible.

The atmospheric properties comprise also periodical pressure fluctuations, commonly denoted as sound noise or the like. It is to be noted, that a microphone falls under the wording of the respective claim. One application to edit a digital content with the use of sound can be given e.g. by changing graphical content like a picture with a sound input. A game application can be used to control the movement of an object by a sound, in the case of the mobile phone game "snake" this can be used to direct the snake to the left and to the right by humming high and low frequencies. Such a game application can provide an additional experience to the user, if the snake can move freely even diagonal on the display. Another example of a sound sensor controlled editing can be a drawing application using the loudness and a detected tone to move a cursor over the display to sketch small drawings.

In yet another embodiment of the present invention said mobile electronic device further comprises a processor being configured to change device settings according to said obtained sensor data. This processor provides extra features for an increased user friendliness, as the sensor data are available they can be used to simply the user interaction e.g. by adapting the brightness of a display device to the data received from an illumination sensor. Another application would be to scroll or mark a text document according to received orientation sensor. data. Acceleration data can be used to change the pitch, speed, and the volume of a sound or a piece of music. Such features are known from e.g. spaceship toys to generate space and action sounds to a simple piece of plastic, but such a toy can only generate a sound and is not capable of editing a sound or an audio file.

Another embodiment of the mobile electronic device further comprises a user interface, for manually overriding said automated editing functionality. Thereby a user can generate a text without the use of the automated devices of the preceding description. So a user can edit a digital text, audio or video content according to his preferences and can generate a mailbox answering text according to his preferences without being forced to use the sensor input.

According to another aspect of the present invention, a method for editing digital content on a mobile electronic device in accordance with obtained sensor data is provided. The method comprises obtaining of sensor data from a sensor, and editing a digital content in accordance with said obtained sensor data. said sensor data can concern e.g. information related to the context of said mobile electronic device. As can be recognized from the preceding description of the mobile terminal devices said digital content can comprise text, audio and video data and the sensor input can be received from an external sensor or from an internal sensor of said mobile terminal device.

In one embodiment of the method said edited digital content is an announcement message stored in said mailbox. The main benefit of a mailbox editing an answering text according to received sensor data is that only a relative small number of relations is required to provide a sophisticated and huge number of different, accurate and informative answering texts to a single answering machine.

Another embodiment of the present method further comprises the reception of a communication request. The reception of a communication request can be used to initiate the editing of a basic answering text according to the present invention. If the answering text should comprise a personal word of welcome, it is helpful to know the sender of the communication request. Additionally, if the reception of a communication is used to start the editing of a communication request, the number of editing operations can be reduced to a minimum.

In another embodiment of the method said obtained sensor data are evaluated, and said editing of said digital content is executed in accordance with the result of said evaluation operation.

Another embodiment of the present invention further comprises the reception of sensor data from an external sensor. The external sensor can be a position sensor, a sensor to identify a sender of a communication request and the like.

According to yet another embodiment of the present invention, the method further comprises transmitting of said edited digital content. In the mailbox application this represents the replay of the answering text to a caller. In contrast to the standard answering machine the answering text can be generated just in the moment it is required. The generation of said answering text can be executed by editing a basic text according to said obtained and evaluated sensor data.

In another embodiment of the method, the settings of the device are changed comprising changing of device settings in accordance with said sensor data. This change of settings provides an increased user friendliness, which could be used as the sensor data are available anyway.

Yet another embodiment of the present invention provides a method further comprising manually editing said digital content by user input. Such a "manual override" can be used to provide a semiautomatic editing functionality. A manual override further helps a user to use the mobile electronic device as a conventional device.

According to another aspect of the present invention, a software tool capable of carrying out the methods of the preceding description is provided, which comprises program code means for performing all of the steps of the preceding description when said software tool is incorporated in a program which is run on a computer or a network device.

According to yet another aspect of the invention, a computer program is provided comprising program code means stored for carrying out the aforementioned methods of the preceding description when said computer program is run on a computer or a network device.

According to yet another aspect of the invention, a computer program product is provided comprising program code means stored on a computer readable medium for carrying out the method of the preceding description when said program product is run on a computer or a network device.

For the purpose of this specification the term "edit" is used to encompass all kind of generating new content, processing available content, selecting and producing alternative content and changing content.

BRIEF DESCRIPTION OF THE DRAWING

In the following, the invention will be described in detail by referring to the enclosed drawings, in which.

BEST MODE FOR CARRYING OUT THE INVENTION

Figure 1:
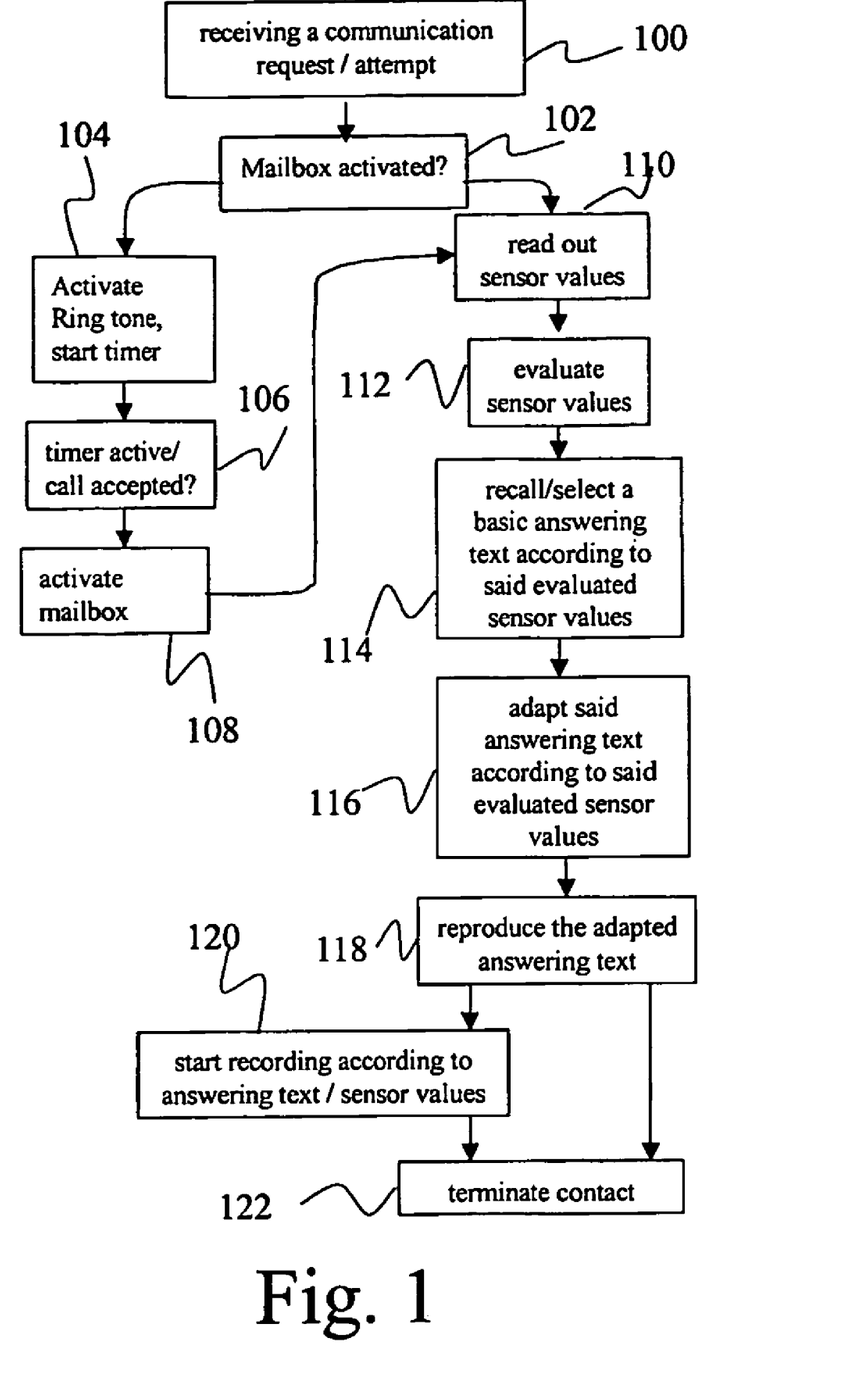
FIG. 1 is block diagram of a method operating a mobile mailbox for adapting an announcement to sensor values according to one aspect of the present invention.

FIG. 1 is a block diagram depicting the operation of a mobile communication device with a built in mailbox capable of adapting an answering text to obtained sensor values. The process is initiated with the reception of a communication request 100 at the mobile communication device. As in the case of conventional communication devices with mailboxes, it is determined if the mailbox is activated 102. This is usually done by requesting the settings of the communication device. If the device is e.g. in a sleep mode, and it is not to be expected that the user will take the call, the mailbox is activated 110. If the mailbox is not activated, a ring tone is started 104, as in the case of a conventional mailbox. Simultaneously a timer is activated to detect if the user is accepting the call or not. If the user accepts the call, or the timer is active if the mail box is not activated 106. If the timer runs out while the communication request is still active and the call has not been accepted by the user, the mailbox is activated 108.

The activated mailbox starts reading out sensor values 110. Next, the sensor values are evaluated 112 to obtain information how the answering text is to be selected or adapted to the sensor values. The evaluation comprises steps like discriminating sensor values, judging the values and sorting the values according to their importance. This can be done by tables, functions and relations, or other user selectable regulations. So, e.g. a position information can be rated higher than a local time of day, and temperature data may be rated the lowest. The evaluation can be executed by defining e.g. an operational-/environmental-state tuple, and the evaluation can be done by using vector algebra, or a matrix calculation, to obtain an answering text tuple which can be used to generate/adapt an answering text to the present situation. The mailbox can then select a basic answering text 114 and adapt 116 it according to the answering text tuple. The generated answering text or announcement is then reproduced to the caller 118. According to the answering text a recording can be started 120 to enable the caller to leave a message. The mailbox can terminate the connection 122 after the recording, or directly after the announcement, depending on the values in the answering tuple or to the chosen answering text.

Figure 2:
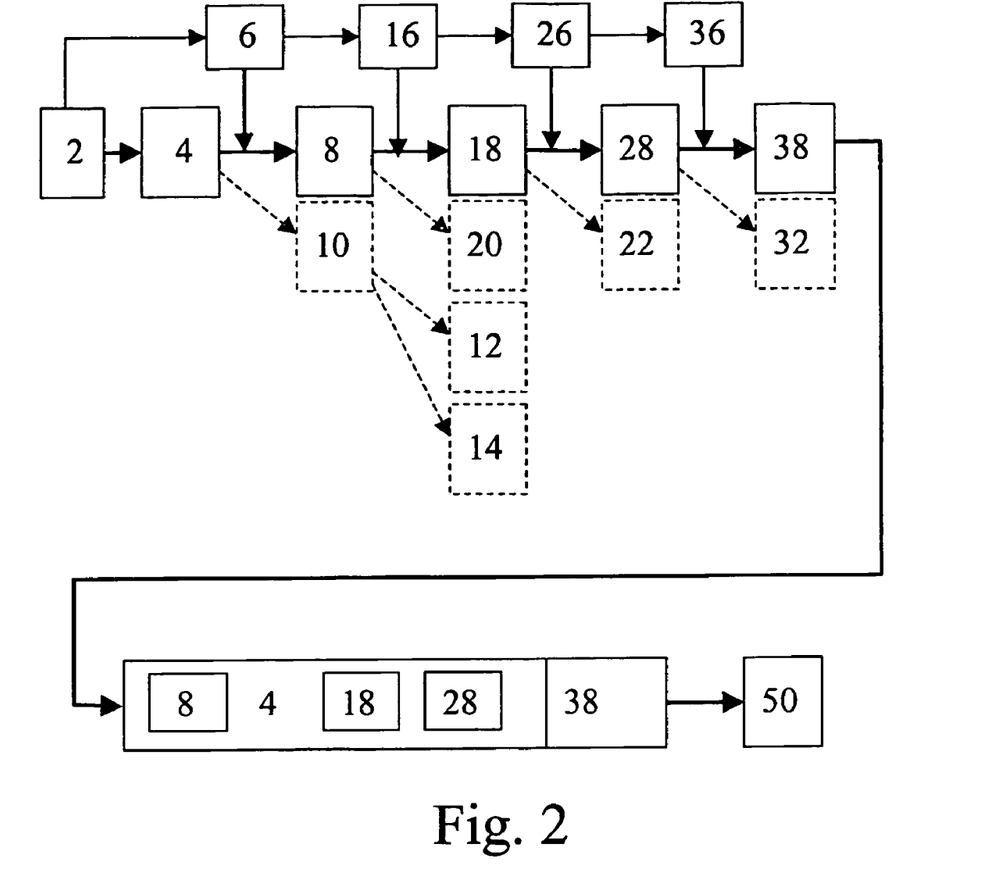
FIG. 2 is a block diagram of depicting the adaptation of an answering text of a mailbox according to FIG. 1.

FIG. 2 is showing one embodiment of the editing of an answering text of a mailbox according to another aspect of the invention by means of a block diagram. As an example the editing of an announcement of an answering machine is used. The depicted functionality corresponds to the blocks 110 to 118 of FIG. 1 and shows another method of generating and adapting the announcement of a voice mailbox. The method starts with the detection of a triggering event 2. In a mailbox system this is the reception of an incoming communication request, for example a call. It is assumed that the device executing this method actually has recognized in step 2 that an announcement is to be produced, e.g. by having requested the operational state of the device. In step 2 the answering machine recalls a basic answering text 4, and after that, requests a first sensor 6 to produce a sensor value and requests the processor to edit the basic text to the details of a private mode. An example of a basic answering text can be "This is number 26580, please leave a message after the signal" The first sensor 6 can e.g. be a Bluetooth component to determine the presence of a local wireless network which indicates an office or a home environment. This first editing can be used to add a private greeting 8 or an official greeting 10 to the basic announcement text 4. The private greeting 8 can change the heading to: "This is Suzy and Paul . . . ", and an official greeting 10 can e.g. sound like: "Welcome to NOKIA, Dr. Frank is actually not available . . . ", wherein this change can be done according to automated processing capability of the processor. After fixing the intro, a sensor 16 can be used to determine additional information such as: " . . . we are actually in the cinema/opera, . . . " 18 or "we are shopping . . . " 20, according to the sensor information of sensor 16. The sensor 16 is an activity sensor capable of determining a user activity. The sensor information 16 can be entered manually by the user, or may be derived from a diary and a time/date information. In case of the formal announcement, the sensor information can recall a text element as ". I'm in a meeting . . . " 12, or " . . . I'm actually away on business . . . " 14. The next sensor 26 can be used to determine information related to an expected accessibility of the user, like " . . . until 23 o' clock . . . " 28 or " . . . till October the 3$^{rd}$ " 22. An additional sensor 36 can be requested for information about the presently available storage space to generate or insert an end text like ", . . . please leave a message after the signal, and we call you back . . . BEEP." 38 or an ending like "please try again." 32. In the present example the basic text "This is number 26580, please leave a message after the signal", has been altered into "This is Suzy and Paul . . . we are actually in the cinema . . . until 23 o'clock . . . please leave a message after the signal, and we call you back. BEEP ", as created by blocks 8, 4, 18, 28, 38. Then finally the whole text is reproduced and sent to the origin of the communication request 50.

Figure 3:
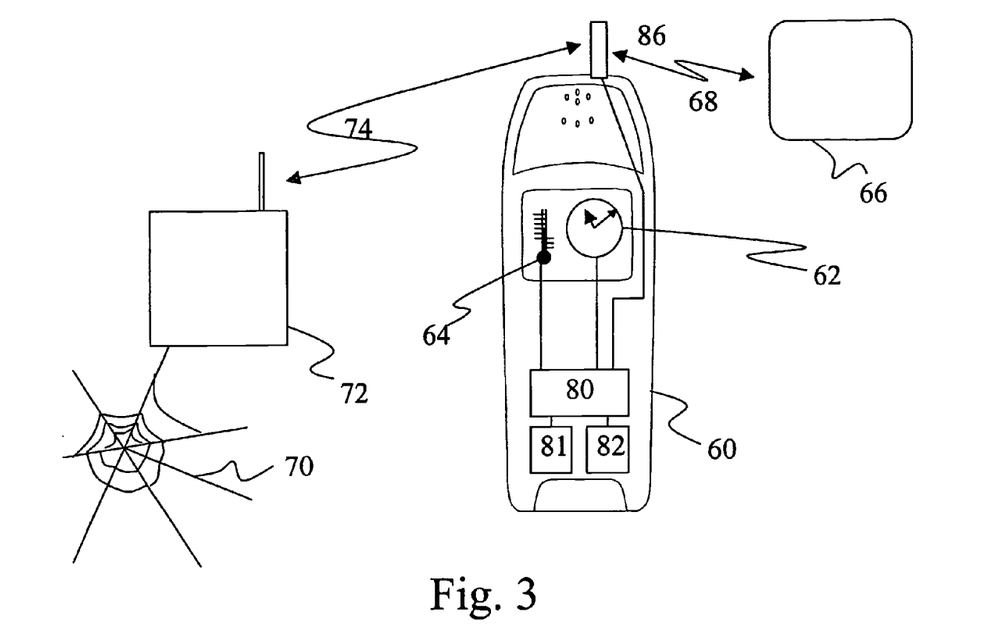
FIG. 3 is an example of an embodiment of the mobile device according to another embodiment of the present invention.

FIG. 3 is an example of an embodiment of the mobile device shown in an environment necessary to operate a sensor controlled answering text generation, according to another embodiment of the present invention. FIG. 3 can be divided up into three parts.

Part one is a communication network 70 providing a mobile connectivity to the mobile terminal device 60 via a mobile base station 72 and an air interface 74. The mobile communication network can e.g. be a GSM or a UMTS network as known in the art. The base station can be a conventional base station as known in the art. The air interface 74 connecting the network 70 and the terminal device 60 can be embodied as a conventional TDMA (Time Division Multiplex Access) connection or any other radio connection. The elements 70, 72 and 74 are only to provide a path to deliver a communication attempt to the mobile terminal device 60.

Part two is the mobile terminal device 60. The mobile terminal 60 comprises an antenna 86 to connect to the base station 72 and to external sensors 66 via respective air interfaces 74, 68. The mobile terminal device comprises in this case an internal temperature sensor 64 and an internal time sensor 62, indicated as the depiction of a thermometer and a clock on a display of the device 60. Both sensors are connected to the processor 80. The processor 80 is connected via a radio component (not shown) to the antenna to exchange data and information with the communication network 70 and with external sensors 66.

The processor 80 is further connected to a mailbox memory 81 storing basic announcements and text elements to adapt the announcements to sensor data received from internal 62, 64 or external 66 sensors. The processor 80 is further connected to a relation memory 82 storing basic relations or prescriptions on how to process and interpret the sensor values and how to generate and adapt the announcements and text elements to generate a respective answering text.

Part three is at least one external sensor 66 connected to the device via an air interface 68. These sensors can be, e.g. satellites of the GPS system, Bluetooth devices or the like to determine a position or the like.

As described in the FIGS. 1 and 2, the mobile terminal comprises all elements necessary to adapt an announcement of a mailbox to sensor data received from internal or external sensors.

It may be noted, that in the case that no sensor data are available, the basic answering text is reproduced unchanged.

It may be noted that the devices in the present description need a relatively large storage space such as a micro harddisc, to offer a good functionality of automated editing functions. The mobile electronic devices have a large memory for storing digital audio and video content and computing capacity for creating and editing such kind of information. In case of a small data base to be edited it may otherwise be better to just have a collection of pre-stored solutions to be recalled as in the case of a conventional answering machine changing the text in dependence of the remaining storage space.

It is to be noted that the invention is about editing digital text/audio/video content, which has been taken via audio recorder, camera or received via DVB-T for instance. In fact, the invention is valid for all type of audio/video content being on said mobile device or brought to the mobile device, independently of the transmission path (i.e. by memory card, over the air, by Bluetooth link, SMS, MMS, etc.).

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently various options of implementing the invention as determined by the claims, including equivalent implementations, also belong to the scope of the invention.

The invention claimed is:

1. Mobile electronic device comprising:
   a storage device configured to store digital picture/video data;
   a processor configured to edit and change said stored digital picture/video data; and
   a component configured to obtain data provided from a sensor, said processor being configured to generate and/or process said digital picture/video data according to said obtained sensor data;
   the mobile electronic device further comprising a mobile telephone;
   said digital picture/video data to be edited comprising an announcement message contained in a mailbox of said mobile electronic device;
   said processor being configured to generate and/or process a basic announcement of said mailbox automatically according to said obtained sensor data.

2. Mobile electronic device according to claim 1, wherein the mobile electronic device further comprises a text-to-speech transducer to read out said announcement stored as a text data file.

3. Mobile electronic device according to claim 1, wherein said storage device is configured to store digital content having digital audio data.

4. Mobile electronic device according to claim 1, wherein said storage device is configured to store digital content having digital text data.

5. Mobile electronic device according to claim 1, wherein said processor is configured to evaluate said obtained sensor data.

6. Mobile electronic device according to claim 1, wherein said component configured to obtain sensor data comprises a receiver.

7. Mobile electronic device according to claim 1, wherein said component configured to obtain sensor data comprises at least one sensor built-in in said mobile electronic device.

8. Mobile electronic device according to claim 1, wherein said sensor is a position sensor.

9. Mobile electronic device according to claim 1, wherein said sensor is an optical sensor.

10. Mobile electronic device according to claim 1 wherein said processor is configured to change device settings according to said obtained sensor data.

11. Mobile electronic device according to claim 1 wherein the mobile electronic device further comprises a user interface configured for allowing a user to manually override said generating/processing.

12. Method comprising:
    storing in a storage device digital picture/video data;
    editing and changing with a processor said stored digital picture/video data;
    obtaining data from a sensor with a component; and
    generating/processing said digital picture/video data stored on a mobile electronic device in accordance with said data obtained from said sensor;
    generated digital content being stored as an announcement file of a mailbox.

13. Method according to claim 12, wherein the method further comprises receiving a communication request.

14. Method according to claim 12, wherein the method further comprises evaluating said data obtained from said sensor, and wherein said generating/processing of said digital picture/video data is done in accordance with a result of said evaluation operation.

15. Method according to claim 12, wherein the method further comprises receiving sensor data from an external sensor.

16. Method according to claim 12, wherein the method further comprises transmitting of said changed digital content.

17. Method according to claim 12, wherein the method further comprises changing of device settings in accordance with said sensor data.

18. Method according to claim 12, wherein the method further comprises manually editing said digital picture/video data by user input.

19. A method according to claim 12, wherein the method comprises using a software tool having a program code that is run on a computer device or the mobile electronic device.

20. A method according to claim 12, wherein the method comprises using a computer program having program code that is run on a mobile computer or network device.

21. Computer-readable storage medium having computer-executable components comprising storing in a storage device digital picture/video data; editing and changing with a processor said stored digital picture/video data; obtaining data provided from a sensor with a component; generating/processing said digital picture/video data stored on a mobile electronic device in accordance with said data obtained from said sensor; and storing generated digital content as an announcement file of a mailbox.

22. Apparatus comprising:
    means for storing digital picture/video data;
    means for editing and changing said stored digital picture/video data;
    means for obtaining data provided from a sensor, and
    means for generating/processing said digital picture/video data stored on a mobile electronic device in accordance with said data obtained from said sensor, wherein generated digital contents is stored as an announcement file of a mailbox.

* * * * *